United States Patent Office 3,637,807
Patented Jan. 25, 1972

3,637,807
CATALYTIC PROCESS FOR THE PREPARATION OF PHENOXYBENZOATES, PHENYL ETHERS AND DERIVATIVES THEREOF
Warren W. Kaeding, Westfield, N.J., and Joseph J. Ligi, La Porte, Tex., assignors to The Dow Chemical Company, Midland, Mich.
No Drawing. Filed Apr. 9, 1969, Ser. No. 814,812
Int. Cl. C07c 69/78
U.S. Cl. 260—473          13 Claims

ABSTRACT OF THE DISCLOSURE

When benzoic acid or a monosubstituted benzoic acid is subjected to air oxidation in the liquid phase in the presence of dissolved copper and magnesium or other promoter metal to produce the corresponding phenol, the phenoxybenzoic acid is also produced as a significant coproduct when a concentration of at least 0.1 mole of the phenol per mole of benzoic acid or its equivalent is maintained in the reaction mixture. The phenoxybenzoic acid is largely the ortho isomer. This product is chiefly useful as a chemical intermediate for making plasticizers or other known derivatives. Phenyl ethers are also formed by decarboxylation of the phenoxybenzoic acid.

BACKGROUND OF THE INVENTION

This invention relates to a method for making a phenoxybenzoic acid and other phenoxybenzoates. It relates particularly to a variation of a known process for making a phenol from a benzoic acid whereby said phenoxybenzoates and their decarboxylation products, the corresponding phenyl ethers, are produced as substantial products.

It is known to produce phenol or a substituted phenol by a process wherein a corresponding benzoic acid is heated in the liquid state at about 180–250° C. in the presence of 0.1–5 percent of copper as a dissolved copper compound and wherein at least part of the liquid mixture is contacted with elemental oxygen, usually supplied as air, to maintain at least some of the dissolved copper in the cupric state. Preferably, the liquid reaction mixture is also contacted with steam or water vapor during the course of the reaction. The process is usually run in the additional presence of a dissolved metal compound which serves as a promoter to increase the production of the phenol and to decrease the formation of tar. Compounds of the alkali metals and the alkaline earth metals are known to be effective promoters for the reaction and magnesium is usually preferred. The phenolic product is distilled from the reactor substantially as it is formed with fresh acid feed added to the reactor to maintain the volume of reactor contents more or less constant. Such a process is described in U.S. Re. 24,848.

It has long been recognized that various intermediate products and byproducts are formed in the course of such a process and some of these have been isolated and identified as more or less minor components, of the system. These other products include, in the case where phenol is made, phenyl benzoate, salicylic acid, benzoylsalicylic acid, and the like. The principal reaction mechanism has been postulated as involving salicylate intermediates and the overall reaction is then summarized by the following series of equations:

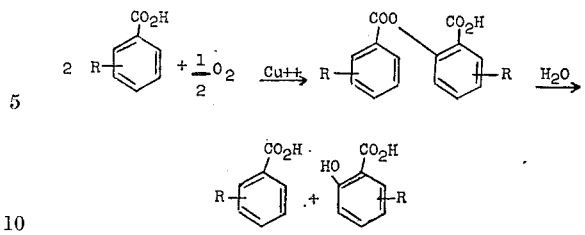

The symbol R represents hydrogen or an unreactive substituent such as lower alkyl, lower alkoxy, fluorine, nitro, or phenyl. The salicylic acid normally decarboxylates to make the phenol. Under particular conditions, it is possible to obtain a reaction mixture containing a considerable quantity of the salicylic acid. It has been recognized that other reactions involving attack on a benzene ring also take place during the course of the process. However, these reactions usually proceed only to a limited extent and their products normally are present as relatively minor constituents of the reaction mixture. This type of reaction is expressed by the following equation which shows the reaction of cupric benzoate with a benzene ring:

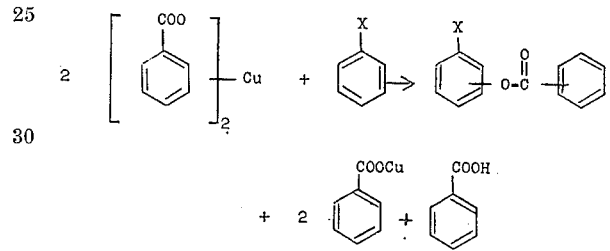

When X represents a carboxy group, hydroxybenzoic acid esters are produced.

SUMMARY OF THE INVENTION

It has now been found that when the above-described process is operated with at least about 0.1 mole of a free phenol per mole of available benzoate in the reaction mixture, an analogous reaction involving a phenol residue takes place and a substantial quantity of phenoxybenzoate is produced. The phenoxybenzoate is usually present both as the free phenoxybenzoic acid and as the phenyl ester. Some metal salts of phenoxybenzoic acid and possibly some of the phenoxybenzoic anhydride may also be present in the reaction mixture along with the secondary product, diphenyl ether, produced by decarboxylation of the free acid.

Metals whose salts effectively promote this reaction are those listed above for the basic phenol process plus manganese. Compounds of two or more such metals may be employed in combination. Magnesium is preferred and a combination of manganese with magnesium has been found to be particularly effective in promoting phenoxybenzoate production.

DETAILED DESCRIPTION

The term phenoxybenzoate is used herein to include the free acid, the anhydride, the phenyl ester, and the metal salts of the acid. These are mainly the ortho-phenoxybenzoates although very small quantities of the meta- and para isomers are usually also present.

Phenoxybenzoic acid and its phenyl ester are intermediates for making high boiling plasticizers for polyvinyl chloride and other such polymers. The bis (phenoxybenzoate) of ethylene glycol is an example. They are also useful intermediates for making known derivatives having biological activity.

The critical step of this invention is the deliberate introduction into the reaction mixture or maintenance therein of substantial quantities of free phenol so as to maintain therein at least a minimum ratio of free phenol to benzoate moiety as described below. Since it is also necessary to maintain dissolved metal promoter in the reaction mixture, a suitable promoter compound may be added more or less concurrently with the added phenol.

Some production of phenoxybenzoic acid and its decarboxylation product, diphenyl ether, occurs in the conventional phenol process, because there is always a small but appreciable concentration of free phenol in the reaction mixture during operation. It is possible, therefore, to study the effect of various changes in conditions, promoter metals, etc. on phenoxybenzoate production during operation of the phenol process. By increasing the concentration of free phenol substantially above its normal level in the reaction mixture, the formation of phenoxybenzoic acid and its derivatives is accelerated to a surprising degree and these phenoxy compounds then become a principal product of the reaction.

Upon continued operation of the process, diphenyl ether and some higher polyphenyl ethers are accumulated in significant concentrations in the preaction mixture by decarboxylation of the corresponding phenoxybenzoic acids. This decarboxylation reaction is favored by operating the process at the higher ends of the respective ranges defined for phenol concentration, temperature, and promoter metal concentration. In general, an alkali metal promoter gives higher phenyl ether production than the polyvalent metal promoters. If desired, therefore, the process can be operated so as to yield substantial amounts of diphenyl ether. Since phenoxy substitution takes place largely ortho to a carboxyl group, decarboxylation of a diphenoxybenzoic acid product forms the meta-diphenoxybenzene as the principal product.

The effect of the higher phenol concentration in the reaction mixture can be postulated as causing a substitution of one phenol molecule for one of benzoic acid in the reaction mechanism outlined above, thereby producing an overall reaction somewhat as follows:

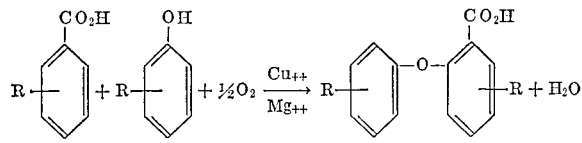

Where two unsubstituted ortho positions are present in the benzoic acid molecule, some of the diphenoxybenzoic acid is also formed, largely the 2,6-isomer. R represents an unreactive substituent as defined above, that is, lower alkyl, lower alkoxy, fluorine, nitro, or phenyl.

By using a phenol and a benzoic acid having different R substituents, the corresponding phenoxybenzoate is produced. However, since some of the benzoic acid is converted to the phenol in the normal course of the reaction, some phenoxybenzoate having identically substituted benzene rings is also formed. It is to be understood that the above equations are offered only as simplified illustrations of possible reaction sequences. The reactions which actually occur in the complex systems involved are undoubtedly considerably more complicated.

The terms "a phenol," "a benzoic acid," and "a phenoxybenzoate" are used herein to define respectively a monohydric phenol, a benzene monocarboxylic acid, and a corresponding phenoxybenzoate as defined above.

Phenol concentrations sufficient to increase phenoxybenzoate formation to a substantial degree are at least 0.1 mole per mole of available benzoate present in the reaction mixture. By available benzoate is meant a benzoic acid compound which is available to react as a benzoate moiety and it includes a free benzoic acid or its anhydride or metal salt where the metal is copper or a promoter metal. Obviously, benzoic anhydride and divalent metal benzoates contain two benzoate moieties per molecule. For practical reasons, the phenol/benzoate mole ratio is restricted to a maximum of about 10/1 and preferably to a maximum of 5/1.

In order to have significant production of phenoxybenzoate, it is necessary to have at least one dissolved metal promoter compound, preferably the metal benzoate, present in the reaction mixture in addition to dissolved copper. Effective promoter compounds are the compounds of the alkali metals lithium, sodium, and potassium, the alkaline earth metals calcium, magnesium, barium, and strontium, and also the compounds of manganese. For best results, 0.1–10 atoms of promoter metal is employed per atom of copper dissolved in the reaction mixture. The alkali metals, barium, and manganese have been found to favor decarboxylation and so give higher yields of the secondary products, the phenyl ethers.

The temperature range for the new process is that previously noted, i.e., about 180–250° C. A process temperature of 200–230° C. is preferred for phenoxybenzoate production.

The present process involves an oxidation in the same way as the closely analogous phenol process and both can proceed to the extent that cupric copper is present without added oxidizer. However, for practical operation, particularly in a continuous process, the liquid reaction mixture is contacted at least intermittently with an oxygen-containing gas, usually air. Preferably, the reaction mixture is also similarly contacted with water as water vapor or steam in order to prevent esterification of the free phenol and the consequent undesirable lowering of the free phenol concentration.

The phenol concentration can be maintained within the desired range by adding phenol to the mixture or by retaining in the reaction mixture all or a part of the phenol produced. Since the new process makes a substantial amount of phenol along with the phenoxybenzoate, a preferred mode of operation comprises recycling to the reaction mixture part of the phenol produced along with fresh benzoic acid feed as needed while drawing off the remainder of the phenol as a product. The phenoxybenzoate product can be separated by drawing off at least a part of the reactor contents, periodically or continuously, separating the phenoxybenzoate component by extraction, crystallization, distillation, or other conventional means, and returning the other values to the reaction zone as desired. In this way, the process is operated to produce both phenol and phenoxybenzoate. In this mode of operation, it may be advantageous to operate the reactor under superatmospheric pressure. However, pressure is not a critical factor and any pressure consistent with keeping the reactor contents in the liquid phase can be employed.

The process is operated in a similar fashion when diphenyl ether is separated as a minor or major byproduct of the reaction. Operation of the process purposely to make larger quantities of phenyl ethers, principally diphenyl ether, involves use of higher values of the numerical conditions outlined above. Illustrative preferred conditions which favor ether production are a temperature of 220–250° C., a phenol concentration of 3–5 moles per mole of available benzoate, and a promoter metal concentration of about 3–10 atoms per atom of copper.

EXAMPLE 1

An electrically heated upright cylindrical reactor was equipped with inlets permitting addition of fluid materials at the top or bottom. An outlet at the top of the reactor was connected to a distillation column with a reflux head having an adjustable take-off allowing return of some or all of the condensed distillate to the reactor. Uncondensed gases passed through the head to a series of traps and gas measuring and analyzing equipment. For the purpose of this experiment, the reflux head was adjusted so as to return essentially all of the condensed distillate, largely phenol and benzoic acid, to the reactor. The reactor was initially charged with 1176 g. of benzoic acid, 180 g. of cupric benzoate, and 110 g. of phenol and the contents were heated at 200° C. for 115 minutes. A stream of 2 l./min. of nitrogen was bubbled through the reaction solution from a bottom inlet for agitation. The temperature was then raised to 220° C. where it was maintained throughout the remainder of the experiment. Other changes were made in the course of the run as follows: (1) adding phenol to the reaction mixture during particular intervals, (2) bubbling air instead of nitrogen through the mixture, (3) adding magnesium benzoate, and (4) adding water to the mixture. At the end of each such change in conditions, a sample of the reactor contents was taken and analyzed by the following procedure. The sample was extracted with ether containing sufficient 5 N HCl to decompose the metal organic salts. The resulting ether layer contained all of the organic portion of the sample except for a small amount of insoluble tar present in some samples. The ether layer was extracted with aqueous sodium bicarbonate. The aqueous extract then contained the organic acids while the extracted ether layer contained the neutral and phenolic compounds including ethers, esters, and phenols. Each layer was worked up by conventional procedure to isolate the total organic content and these products, referred to as acid and neutral fractions respectively, were analyzed by vapor phase chromatography, the acids first being converted to their methyl esters for the purpose. The acid fraction consisted essentially of benzoic acid and phenoxybenzoic acid. Since the latter compound is relatively insoluble in water, it is conveniently isolated by extracting the acid fraction with hot water. Substantially pure phenoxybenzoic acid is thereby obtained as the extracted residue. The conditions and results of the above experiment are listed in the following table.

|  | A | B |
|---|---|---|
| Reactor charge: |  |  |
| Diphenyl ether | 1,651 | 1,525 |
| Cupric benzoate | 180 | 180 |
| Magnesium benzoate | 418 | 0 |
| Benzoic acid | 100 | 100 |
| Phenol | 300 | 300 |
| Products found: |  |  |
| Phenoxybenzoic acid [1] | 79 | 5 |
| Phenyl phenoxybenzoate [1] | 11 | 15 |
| Phenyl benzoate | 173 | 41 |
| Tar | 38 | 102 |

[1] Ortho isomer.

The remainder of the reaction mixture as acidified consisted largely of diphenyl ether, benzoic acid, and phenol. Similar results are obtained when the magnesium benzoate in Run A is replaced by lithium benzoate, barium benzoate, manganese benzoate, cobalt benzoate, or the benzoate of other such promoter metal as previously defined.

When the procedures of Examples 1 and 2A are repeated using a substituted phenol and a substituted benzoic acid and benzoate salts as previously defined, the corresponding substituted phenoxybenzoic acid is obtained. For example, by reacting a mixture of p-cresol, p-toluic acid, and cupric and calcium p-toluates as described above, the phenoxybenzoate product obtained is essentially 2-(p-tolyloxy)-p-toluic acid. Similary, o-fluorophenol, o-fluorobenzoic acid, and dissolved cupric and barium o-fluoro-benzoates are reacted to produce 2-fluoro-6-(o-fluorophenoxy)benzoic acid and p-phenylphenol, p-phenylbenzoic acid, and dissolved cupric and lithium compounds are reacted to make 2-(p-phenylphenoxy)-4-phenylbenzoic acid. In the same way, a mixture of p-cresol with benzoic acid and cupric and manganese benzoates is reacted to produce o-(p-tolyloxy) benzoic acid. Also, 2-(p-ethoxyphenoxy)-4-ethoxybenzoic acid is prepared by reacting p-ethoxyphenol with p-ethoxybenzoic acid in this process and 2-(p-nitrophenoxy)-4-nitrobenzoic acid is similarly made from p-nitrophenol and p-nitrobenzoic acid.

TABLE

| Total time, minutes | Inlet gas | | Catalyst, grams | | Phenol added, grams | Water added, g./min. | Reactor sample analysis, percent | | | |
|---|---|---|---|---|---|---|---|---|---|---|
| | | | | | | | Neutral | | Acid | |
| | Type | l/min. | Cu | Mg | | | Total [1] | PPB [2] | Total [1] | PBA [3] |
| 170 | N$_2$ | 2 | 37.5 | 0 | 0 | 0 | 6.6 | 0 | 91.0 | 0.05 |
| 235 | Air | 1.8 | 37.5 | 0 | 100 | 0 | 11.9 | 0 | 86.2 | 0.24 |
| 360 | Air | 1.8 | 37.5 | [4] 37.5 | 100 | 0 | 25.2 | 1.5 | 70.1 | 2.14 |
| 565 | Air | 1.8 | 37.5 | [4] 37.5 | 200 | 0 | 46.3 | 5.7 | 49.2 | 7.5 |
| 775 | Air | 1.8 | 37.5 | [4] 37.5 | 0 | 1.0 | 44.4 | 9.6 | 50.0 | 13.4 |
| 985 | Air | 1.8 | 37.5 | [4] 37.5 | 100 | 1.0 | [5] 38.0 | 16.9 | 54.5 | 18.3 |

[1] Weight percent of reaction mixture.
[2] Mole percent phenyl phenoxybenzoate in neutral fraction.
[3] Mole percent phenoxybenzoic acid in acid fraction.
[4] Added as MgO to reaction mixture.
[5] Included 5.5 percent diphenyl ether and 1.6 percent m-diphenoxybenzene.

EXAMPLE 2

Two similar runs were made in the reactor of Example 1 to show the effect of magnesium benzoate in the reaction. Both runs were made in diphenyl ether medium to reduce the benzoic acid concentration. These runs were carried out at 200° C. for about 3½ hours with a stream of 1.8 l./min. of air bubbling through the reaction mixture. The products were worked up and analyzed as previously described. The compositions of the products are listed as found after acidification and removal of the copper and magnesium ions. Quantities are listed in grams.

EXAMPLE 3

The procedure of Example 1 using combined copper and magnesium catalyst was followed substantially except that after two hours of running, the air feed was enriched to contain about 60% oxygen. After several hours' running time under these conditions, about one fourth of the reaction mixture had been converted to phenoxybenzoate, largely o-phenoxybenzoic acid.

EXAMPLE 4

The apparatus described in Example 1 was run using various metal benzoate promoters under conditions similar to those for normal phenol production with phenol continuously distilled from the reactor and fresh benzoic acid feed added as required. The quantity of o-phenoxybenzoate produced by each promoter or combination of promoters was determined by analysis of the reactor contents after running 5.5–7 hours. In each run, the reactor was initially charged with 1500 g. of benzoic acid with a total overall charge of 2400 grams. The reactor contents contained 0.59 g. atom dissolved copper, the temperature was 230–240° C., and air at 4 liters per minute with steam added as noted were bubbled through the reaction mixture under ambient pressure. Results thereby obtained are summarized in the table below.

| Run Number: | Promoter, grams atoms | | Steam, grams/ minutes | o-Phen- oxy- benzoate, weight percent |
| --- | --- | --- | --- | --- |
| | Mg | Other | | |
| A | 1.56 | None | 2.4 | [1] 1.4 |
| B | 1.18 | Na, 0.59 | 2.15 | 2.4 |
| C | 1.18 | Li, 0.59 | 2.4 | 6.4 |
| D | 1.18 | K, 0.59 | 2.4 | 2.0 |
| E | 1.18 | Sr, 0.59 | 2.3 | 4.3 |
| F | 1.18 | Mn, 0.77 | 2.2 | 6.6 |

[1] (22 hours.)

It is seen that combinations of lithium with magnesium and manganese with magnesium are particularly effective. The latter is preferred for its lower rate of tar formation. In these experiments, the phenyl ether fraction of the product mixture was similar to but smaller than the phenoxybenzoate concentration, running about 15–70 percent of that figure.

By introducing free phenol into the reactor and maintaining its concentration therein at 0.1 mole per mole of available benzoate or higher as previously specified, the quantities of phenoxybenzoic acid and derivatives, including phenyl ethers, are substantially increased to the point where these compounds become substantial components of the reactor contents. Comparable results are obtained when the second promoter metal is calcium or barium and when the magnesium is replaced by an equivalent quantity of any of the other promoter metals. Example 5 illustrates the effect of the promoter metal on decarboxylation of phenoxybenzoic acid to make diphenyl ether.

EXAMPLE 5

An apparatus as described in Example 1 was charged with 1050 g. of benzoic acid, 47.8 g. of cupric oxide (0.60 g. mole), and 1.125 g. atom of promoter metal added as the benzoate, carbonate, oxide, or hydroxide. The reaction mixture was maintained at 236° C. while a mixture of superheated steam (at 250° C. and 100 ml./hr.) and air (185 liters/hr.) was bubbled through it. The phenol thereby produced was largely distilled off more or less as it formed along with lower boiling materials and vent gas while the liquid level in the reactor was maintained by periodic addition of benzoic acid. Each run was carried out under these conditions for 14 hours. Phenol and diphenyl oxide were determined by gas-liquid chromatography. No measure was made of phenoxybenzoate production other than the indirect measure obtained by diphenyl ether analysis.

| Promoter metal | Phenol, grams/ hour/ liter | Diphenyl ether, grams |
| --- | --- | --- |
| Mg | 67.4 | 4 |
| Ca | 62.0 | 10 |
| Ba | 67.6 | 34 |
| Mn | 68.2 | 17 |
| Na | (a) | 19 |
| K | (a) | 36 |
| Li | (a) | 7 |

(a) Phenol production was similar to that with other promoter metals with the lithium showing somewhat lower phenol production than the other two alkali metals.

The experiments in Example 5 were made with a phenol concentration below that desirable for phenoxybenzoate and phenyl ether production. However, the results provide an indication of relative efficiencies of the various metals for the production of these substances.

We claim:

1. A process for making a phenoxybenzoic acid and the phenyl ester, and metal salt thereof which comprises heating at about 180–250° C. a liquid reaction mixture consisting essentially of at least one benzoic acid compound of the group (1) benzoic acid, (2) monosubstituted benzoic acid wherein the substituent is lower alkyl, lower alkoxy, fluorine, nitro, or phenyl, (3) the anhydride of said acid, or (4) the copper or promoter metal salt of said acid, 0.1–5 percent of dissolved copper based on the weight of the mixture, 0.1–10 atoms of dissolved promoter metal per atom of copper wherein the promoter metal is at least one of lithium, sodium, potassium, calcium, magnesium, barium, strontium, or manganese, and at least about 0.1 mole of phenol or monosubstituted phenol wherein the substituent is lower alkyl, lower alkoxy, halogen, nitro, or phenyl per mole of benzoic acid compound, and contacting the liquid mixture at least intermittently with an oxygen-containing gas.

2. The process of claim 1 wherein the liquid mixture is also contacted with vaporized water.

3. The process of claim 2 wherein the reaction mixture is heated at 200–230° C.

4. The process of claim 2 wherein the temperature is 220–250° C., the concentration of promoter metal is 3–10 atoms per atom of copper, the phenol concentration is 3–5 moles per mole of benzoic acid compound, and a diphenyl ether is separated from the reaction mixture as a significant product of the process.

5. The process of claim 4 wherein the benzoic acid compound is essentially benzoic acid and its metal salt and the phenol is phenol itself.

6. The process of claim 2 wherein the benzoic acid compound is essentially benzoic acid and its metal salt, and the phenol is phenol itself.

7. The process of claim 2 wherein the promoter metal is magnesium.

8. The process of claim 2 wherein the promoter metal is a combination of magnesium and manganese.

9. A continuous process for making phenoxybenzoic acid and the phenyl ester, and metal salt thereof which comprises heating at about 180–250° C. a liquid reaction mixture consisting essentially of at least one benzoic acid compound of the group benzoic acid, benzoic anhydride, and metal benzoate, 0.1–5 percent of dissolved copper based on the weight of the mixture, 0.0–10 atoms of dissolved promoter metal per atom of copper wherein the promoter metal is at least one of lithium, sodium, potassium, calcium, magnesium, barium, strontium, or manganese, and at least about 0.1 mole of phenol per mole of benzoic acid compound, contacting the liquid mixture at least intermittently with air, continuously distilling phenol from the reaction mixture, recycling at least a part of the distilled phenol and added benzoic acid to the reaction mixture, thereby maintaining a phenol concentration in the mixture of at least about 0.1 mole per mole of benzoic acid compound, removing a part of the reaction mixture at least periodically from the reaction zone, separating at least one product selected from the group consisting of phenoxybenzoic acid, phenyl ester, or metal salt thereof from the part so removed, and returning the liquid of reduced product content to the reaction zone.

10. The process of claim 9 wherein the liquid reaction mixture is contacted in the reaction zone with vaporized water.

11. The process of claim 10 wherein the reaction mixture is heated at 200–220° C.

12. The process of claim 10 wherein the promoter metal is magnesium.

13. The process of claim 10 wherein the promoter metal is a combination of magnesium and manganese.

References Cited

UNITED STATES PATENTS 3,356,744   12/1967   Woodward _____ 260—621

LORRAINE A. WEINBERGER, Primary Examiner

J. F. TERAPANE, Assistant Examiner

U.S. Cl. X.R.

260—438.1, 471 R, 474, 476 R, 612 R, 619 R